United States Patent [19]
Burns et al.

[11] Patent Number: 6,088,694
[45] Date of Patent: Jul. 11, 2000

[54] CONTINUOUS AVAILABILITY AND EFFICIENT BACKUP FOR EXTERNALLY REFERENCED OBJECTS

[75] Inventors: Randal Chilton Burns, Sunnyvale; Inderpal Singh Narang, Saratoga, both of Calif.

[73] Assignee: International Business Machines Corporation, Armonk, N.Y.

[21] Appl. No.: 09/052,921

[22] Filed: Mar. 31, 1998

[51] Int. Cl.[7] .................................................. G06F 9/00
[52] U.S. Cl. .................. 707/8; 707/2; 707/8; 707/9; 707/10; 707/204
[58] Field of Search ................. 705/3, 2; 714/6; 707/1, 10, 8

[56] References Cited

U.S. PATENT DOCUMENTS

| | | | |
|---|---|---|---|
| 5,574,906 | 11/1996 | Morris | 395/601 |
| 5,675,725 | 10/1997 | Malcolm | 395/182 |
| 5,737,536 | 4/1998 | Herrmann | 395/200 |
| 5,764,972 | 6/1998 | Crouse | 395/601 |

*Primary Examiner*—Wayne Amsbury
*Attorney, Agent, or Firm*—James C. Pintner; Gray Cary Ware Freidenrich

[57] ABSTRACT

A computing system provides continuous availability of data files that are maintained at a file management system and linked to a database management system (DBMS) through a Datalink data type, even while any particular file is being changed with DBMS append or update operations. When a file is linked, it is designated to be available for read-only operations. A user who wants to perform updates on a file gets a "check-out" copy of the file for updating operations, such that the original file remains linked to the database system while the copy is being updated and remains available to other users. The file management system includes a "check-in" function that receives the updated file, saves the updated file under a new name different from the original, updates the Datalink, generates new metadata for the updated file, and transactionally updates the file with its new metadata. In this way, data files are continuously available to all users through appending and updating actions. Since updating Datalinks requires the file management system to initiate backup, a "delta versioning" operation, which reduces the data needed to support backup operations, permits more efficient backup of data files and enables the continuously available files to be backed up and consistent.

42 Claims, 10 Drawing Sheets

| GROUP | FILENAME(S) | ACCESS CONTROL | READ-ONLY | RECOVERY ID |
|---|---|---|---|---|
| ⋮ | ⋮ | ⋮ | ⋮ | ⋮ |

FIG. 5

CONTINUOUS AVAILABILITY AND EFFICIENT BACKUP FOR EXTERNALLY REFERENCED OBJECTS

BACKGROUND OF THE INVENTION

1. Field of the Invention

This invention relates generally to database management systems and systems for the storage of data objects, and particularly to efficiently managing access and control over data that is linked to a database system and stored remotely in a file system or other object repository.

2. Description of the Related Art

Data is typically maintained for storage and retrieval in computer file systems, wherein a file comprises a named collection of data. A file management system provides a means for accessing the data files, for managing such files and the storage space in which they are kept, and for ensuring data integrity so that files are kept intact and separate. Applications (software programs) access the data files through a file system interface, also referred to as the application program interface (API). Unfortunately, management of computer data using file management systems can be difficult, because such systems do not typically provide sufficient information on the characteristics of the files (information called metadata). File management systems do not incorporate general purpose query engines for easily searching through the file contents for data of interest.

With reference to the IEEE Mass Storage Systems Reference Model Version 3, May 1990, (developed by the IEEE Technical Committee on Mass Storage Systems and Technology), a Mass Storage System is used to store and administer data objects know as "bitfiles". A bitfile is an arbitrarily long uninterpreted sequence of bits, possessing attributes relating to unique identification, ownership and other properties of the data present in the bitfile, such as its length, time of creation and a description of its nature. A Mass Storage System is able to administer a hierarchy of storage devices for the storage of bitfiles to provide cost effective storage. When used herein the phrases "a system for storing files", "a file system", or "an object repository" encompass the definition of a Mass Storage System as described above.

A database management system (DBMS) is a type of computerized record-keeping system that stores data according to a predetermined schema, such as the well-known relational database model that stores information as a collection of tables having interrelated columns and rows. A relational database management system (RDBMS) provides a user interface to store and retrieve the data, and provides a query methodology that permits table operations to be performed on the data. One such RDBMS is the Structured Query Language (SQL) interface. In general, a DBMS performs well at managing data in terms of data record (table) definition, organization, and access control. A DBMS performs well at data management because a DBMS associates its data records with metadata that includes information about the storage location of a record, the configuration of the data in the record, and the contents of the record.

As part of its data management function, a DBMS performs many automatic backup and copying operations on its tables and records to ensure data integrity and recoverability. Currently, DBMSs are poorly suited to the management of large data objects. To operate on large objects stored in a database., the DBMS needs to export the object to a file system or other data management system. The object is then modified and reimported to the database. For large objects the backup, logging and copying tasks the DBMS automatically performs when manipulating data become prohibitively expensive. This makes the DBMS system overhead too large and the performance insufficient to justify its use for managing most large data objects. Thus, a DBMS often is not useful for managing large amounts of digitized data, including the so-called binary large object (BLOB) data type. A BLOB is a DBMS data type that typically is used for storing arbitrarily large data objects, such as multimedia data files that contain digitized audio and video information. The limitation of the BLOB data type make this database column type unsuitable for applications such as computer aided design and manufacturing (CAD/CAM) and digital libraries. An alternative approach, described in this invention, is to keep large data objects stored as files in a file system and link these references to these external files from the database. This alleviates most of the copying tasks and, with file system support, all of the database consistency and integrity guarantees can be met.

A file management system or file system is used to store data on computer systems. In general, file systems store data in a hierarchical name space. Files are accessed, located and referenced by their unique name in this hierarchical name space. File systems are efficient for storing and accessing data for applications that are aware of the unique name of a file and use the file management system interface.

While file systems are efficient at accessing data, data stored in file systems do not typically have the consistency and integrity guarantees of data stored in databases. Furthermore, by storing object data in a database, additional information about the object may be associated with it in the database record. This metadata about the object permits database applications to make generalized inquiries about the metadata of the object. Such general inquiries may be made through a DBMS interface language, such as SQL. The database system typically incorporates metadata for each file in the underlying file management system and uses the metadata to more easily retrieve a particular file, keep track of file versions, and retrieve files based on contents.

With respect to the BLOB data type, BLOBs are typically accessed through a database system, using an interface such as SQL. Because BLOBs are usually extremely large files and often contain digitized data. it can be relatively difficult to keep track of different BLOB versions. It can be especially difficult to maintain a log of BLOB versions through successive changes. Many DBMSs choose not to log changes to BLOBs and past versions of BLOBs are generally not recoverable. This differs from all other database types which are logged when change and therefore recoverable to previous values. Certain aspects of managing data files are handled well by database management systems, and other aspects are better handled by file management systems.

The Datalink Data Type and Linked Files

There are systems for interfacing file management systems with database management systems, such as computer systems with what is referred to as the "DataLinks" fileserver, such as described in "Method and Means for Linking a Database System with a System for Filing Data", U.S. patent application Ser. No. 08/449,600 filed May 24, 1995. Such "DataLinks" systems use the Datalink data type to "link" or externally reference file system data from within a database. This permits computer systems to support an interface between file management systems and databases, so that file references are accessible through the SQL interface of a DBMS and applications may access such data through the file system interface. In such a system, file data has the integrity and consistency guarantees of being stored in a database, has additional metadata stored in the database for general queries, yet applications may still access this data through the file system interface. Such an arrangement obviates the need for the BLOB data type of a DBMS.

A DBMS that works with interface programs such as the "DataLinks" application provides a general purpose query engine to manage file access, referential integrity, and indices. This permits arbitrarily large data objects to be associated with the DBMS while preserving the file system interface. In this way, existing file management system applications using the Datalink data type can access the data directly without import and export of data through the database system, as would be required by using the BLOB data type. For example, the "DataLinks" system provides a file server with a "Datalinker" component that receives access calls and enforces database constraints, ensuring consistency and referential integrity of file versions and metadata. Applications can query data through SQL calls to the DBMS and can send file access calls through the Datalinker file management component. Recoverability can be guaranteed by using a backup server that stores a backup copy of each file which is linked from the database. In this way, files appear as regular files to file management system applications and appear as database objects to applications referencing the Datalink column through the DBMS.

Typically, the following steps are involved to perform database file management and provide consistent back-up between the metadata and the file content:

(a) User creates a file A1 on a fileserver and populates its content using the filesystem services.

(b) User creates metadata on the content of file A1.

(c) User inserts a row in the database with metadata and reference to A1. The reference to file A1 is stored in a DATALINK column and establishes a "link" to the file. The latter implies that the DBMS applies integrity constraints and initiates backup of the file A1. To maintain consistency of the file content with the metadata, the file is marked as unmodifiable.

Linking files from a file management system access interface with a database management system, by using a DATALINK data type, permits easier editing and manipulation of large data files than the BLOB datatype. This is because the file system services or API's can continued to be used. However, to backup the file and to maintain consistency of the file content with its metadata in the DBMS requires that certain procedures must be followed in order to modify the file. In the next section first the problem is described, and then, it is described how a file is modified when it is referred to by a Datalink column.

Modifying Linked Files

When a user needs to modify a file A1 referred to by a Datalink column, the following procedure that is followed illustrates the problem of the file A1 being unavailable while the file is being modified:

(a) Update the DATALINK column in the database row to null. The purpose of this operation is to remove the constraint of the file being unmodifiable when A1 was linked. It is referred to as "unlink" the file from the database.

(b) Update file A1.

(c) Make metadata of the new content of file A1.

(d) Update the database row with the metadata and the DATALINK column with reference to the new version of the file A1.

The DBMS would link the new version of file A1, i.e., it would apply the constraint of the file being unmodifiable. Also, it would initiate the backup of this new version of file A1.

It should be apparent that the unlink, modify, re-link paradigm described above for editing a file means that externally referenced files are not continuously available. This is because there will be no Datalink in the database after the unlink and before the re-link of a file, and without a Datalink, the file will be unavailable to any access through the DBMS. Continuous availability of files is of vital importance, especially in the case of large networks with many users sharing a database. For example, computer aided drafting and computer aided design and manufacturing (CAD/CAM) applications need to provide continuous availability so they can store large CAD objects in files and provide read-only access to a data object while it is being modified. Also, it is desirable for news servers to provide a news feed that is continuously available to all clients, and therefore news servers would like the ability to add articles without unlinking files.

From the discussion above, it should be apparent that there is a need for a database management system that provides continuous availability of source data files during update and append operations. The present invention fulfills this need.

SUMMARY OF THE INVENTION

The present invention provides a computer system that permits continuous availability of a file that is stored in a file management system and linked or referenced by a database management system (DBMS) through a DATALINK data type, even while the file is being modified at the file management system with either the append or update operation. Applications gain access to a linked file name through the DBMS, access file data through local file systems, and make modifications to that data. During this modification, other applications or users can access the immediately previous version of the file which is registered in the DBMS. When a modifying application finishes writing file data on the local file system, it closes its write access and transactionally updates the Datalink reference to the linked file, to reference the changed file data.

In accordance with the invention, the file management system provides a "check-out" function that manages concurrent updates of a file and makes a copy of the file for updating operations, such that the original file remains linked to the database system while the copy is being updated and remains available to other users while the original file is checked out. The file-management system also includes a "check-in" function that receives the updated file, saves the updated file under a new name different from the original, generates new metadata for the updated file, and transactionally updates the file with its new metadata. In a DBMS, check-in causes an SQL update operation on the Datalink-referenced file.

Also in accordance with the invention, the file management system provides an "append" function that allows applications to modify files by adding data only to the end of the file. While an application or user is appending data, the file is still available to other applications or users through the Datalink column supported by the DBMS. Other applications accessing the file being appended only view the data that existed before the append function was invoked. When an application or user terminates the append function, the file management system transactionally updates the referring Datalink column at the DBMS to link the file in its modified/appended state.

Additionally, the invention describes a system where every time a file is linked in a Datalink column in the DBMS, the DBMS initiates a backup on the linked file data at the file management system. When a linked file is being backed up, a "delta compression" operation reduces the data that must be sent across the network to support backup operations by encoding the new file version using only the bytes that have changed from the prior versions. Delta compression backup greatly reduces the amount of data sent when backing up files. Since all links or SQL Update calls to the Datalink data type trigger file backup, delta compression mitigates the associated costs of linking files. Applications that require frequent modifications to linked data previously required a prohibitive amount of data to be backed up when sending the whole file to a backup server computer system each time a file was linked. With delta compression, the backup cost is reduced to only the cost of transmitting the changed bytes between files. In this way, the computer system supports applications that require continuous availability of files and that utilize large data objects.

The invention can be applied to the operation of updating a linked file A1, which was described above. In accordance with the invention, the procedure could be changed as follows:

(a) Make a copy of file A1 using the filesystem services. Let the copy of the file be called A2.
(b) Modify A2. Note that file A1 remains linked while the user modifies A2 and is available for the DBMS queries.
(c) Make new metadata based on the content of A2.
(d) Update the row which referenced file A1 in the database with the metadata and reference to A2.

The update processing in the DBMS involves the following. File A1 is "unlinked" and A2 is "linked" as part of the same transaction.

Furthermore, as part of link processing of A2, backup for file A2 is initiated. To provide database consistency, integrity and recoverability guarantees, the linked version of the file must be able to be recalled from a backup server. Consider that the file system fails and the contents of a linked file are lost. The DATALINK value in the database is now inconsistent and the file contents, as they were at link time must be restored. Alternatively, consider that the database experiences system failure and has to be recovered to a previous image of the database. A Datalink column in the previous versions may link what is now an out of date file. To make the restored database consistent, the DataLinker must restore the old version of the file.

For DBMSs that link and unlink files frequently, a large number of file backups will be performed by the DataLinker. For each backup, the number of bytes in the linked file will be sent to a backup server. This cost may become prohibitive. Consequently, there is also a need for an efficient backup mechanism to reduce the amount of information sent to a backup server in association with keeping file data and Datalink data type columns consistent and recoverable. The efficient backup involves that only the modified portions of a "versioned" file be backed up. In our example above, the reference file A1 is referred to as a "versioned" file. Assume file A1 is backed up in total. However, the backup operation of the new version of file A2 would involve backing up only the modified portions with respect to A1. The file changes from a prior version define what is called a delta file. This delta file compactly represents A2 as a set of changes with respect to A1. By backing up this delta file instead of backing up the whole file A2, a computer system may reduce the cost of backup for frequently versioned data and files.

In one aspect of the invention, the check-out function generates a local copy of a linked file that is to be modified through the file management system. In accordance with the invention, the linked file includes metadata that designates the linked file as "read-only" and includes fields for the file name, file location, and new file name for the modified version. When a user or application finishes the file modifications, the user or application performs the check-in function and the computer system causes an update operation to be performed on the Datalink column in the database that links this file. This update on the Datalink column triggers an asynchronous backup operation at the Datalinker which backs up and preserves the new content of the linked file.

In another aspect of the invention, a backup server maintains a store of file backup versions, and backup operations employ a delta compression technique whereby a delta compression scheme is used to parse a data stream and compactly represent successive versions of data. When a file is linked or updated, the link often replaces a previous Datalink column value in the database. In this case it is assumed that the unlinked and linked file involved in the SQL Update on the Datalink column are versions of each other. So assuming the file A1 is linked and the Datalink entry referring to A1 is updated to link file A2. Given a versioned file called A1, if a backup operation on a subsequent file version called A2 is to be performed, then a delta compression scheme creates a compact file encoding of A2 called a delta file, represented as $\Delta(A1, A2)$. The delta file, $\Delta(A1, A2)$, is a compact representation of file A2. When a file backup operation is performed, the system executes the delta compression scheme. If a compression above a threshold value is achieved, then the delta file is provided to a backup server rather than the whole unencoded file.

Other features and advantages of the present invention should be apparent from the following description of the preferred embodiment, which illustrates, by way of example, the principles of the invention.

BRIEF DESCRIPTION OF THE DRAWINGS

FIG. 5 is a representation of metadata maintained by the file server of FIG. 1 for files maintained in the file storage.

DESCRIPTION OF THE PREFERRED EMBODIMENTS

Figure 1:
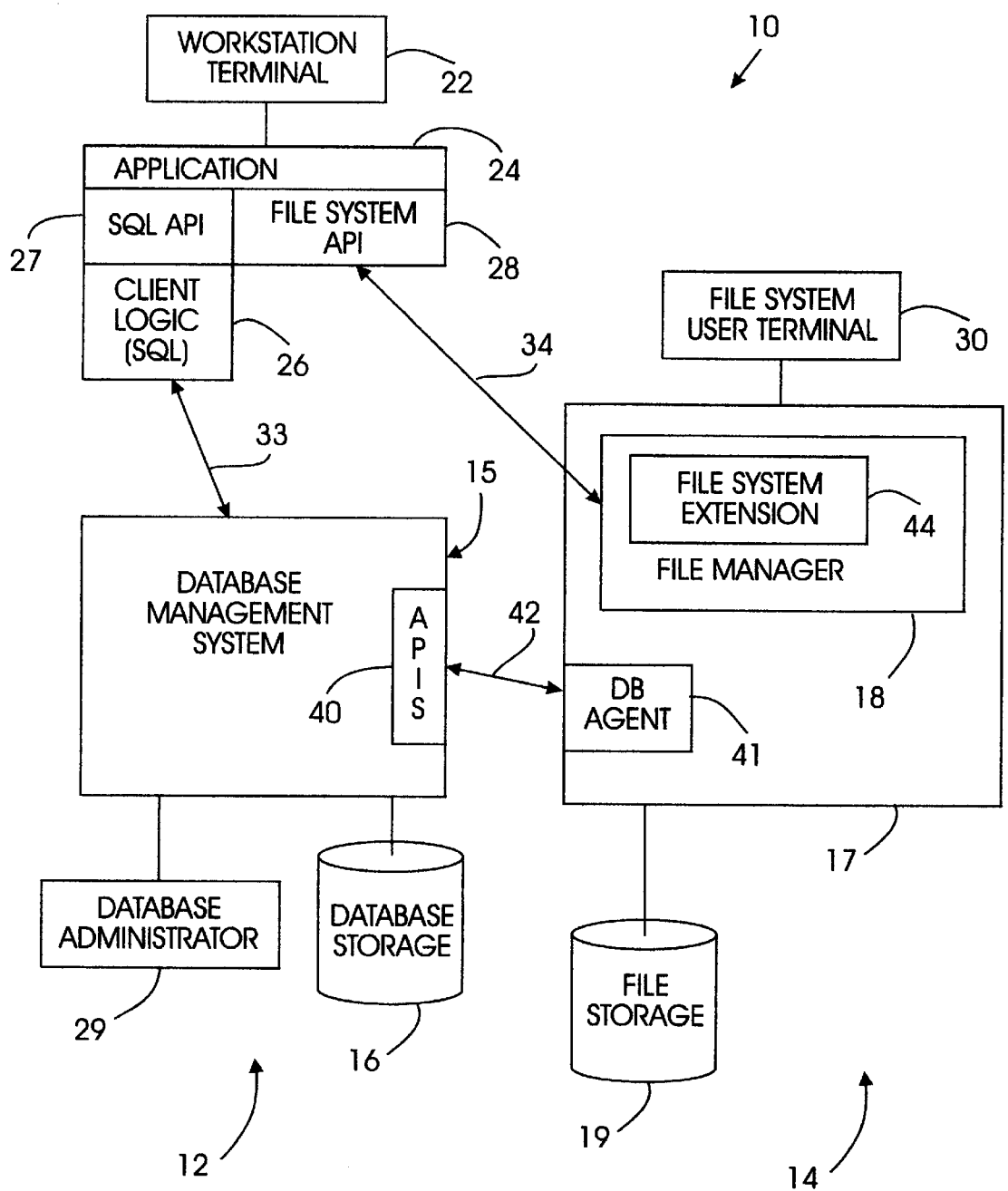
FIG. 1 is a block diagram representation of a computing system constructed in accordance with the invention.

FIG. 1 illustrates an exemplary computing system 10 constructed in accordance with the present invention. The computing system 10 includes a database system 12 and a system that contains a file management system 14. The database system 12 includes a database management system (DBMS) 15 that provides views of, and access to, a database comprising files that are stored on one or more database storage devices 16. The file system 14 includes a file server 17 having a file manager 18 that provides storage-of, and access to, files maintained in file storage devices 19. A computing system user or application communicates through a computer system terminal or workstation 22 to utilize an application program 24 that interfaces with client logic 26. Conventionally, the client logic 26 includes support for database language commands. A first interface in the form of a database language application programming interface (API) 27 operates conventionally between the application program 24 and the client logic 26. In addition, the user processing configuration includes a second interface in the form of a file system API 28 that provides the computing system user 22 with access to the file system 14. The database administrator 29 defines data entities and establishes the scheme that supports requests from the computing system user.

Requests from the computing system user to the data system 12 and responses to such requests are provided over a communication path 33 (hereafter referred to as the "SQL communication path") between the user s computer 22 and the DBMS 15. User requests typically include retrieval, updating, and deletion of data, and addition of new data to the database. The computing system user can communicate with the file manager 18 through the file system API 28 over a communication path 34 (hereafter referred to as the "file communication path") to create, store, and request files in the file system 14.

One or more application programming interfaces (APIs) 40 in the DBMS 15, and a database agent 41 in the file management system 17, are the respective terminals of a communication path 42 between the database system 12 and the file system 14 for exchange of information between the systems respecting files in the file system 14. Specifically, the communication path 42 provides the means by which the DBMS 15 provides control information to the file system 14 that causes the file system to control processing of files according to referential integrity constraints established at the database system 12. In this description, the communication path 42 is also referred to as the "control communication path."

The file system 14 may also be accessed by users and applications, e.g. the file system user terminal 30 without the database system 12 as an intermediary. Preferably, except for the communication path 42, the file system 14 operates independently of, and is external to, the database system 12. That is, it is not the role of the file system 14 to serve the DBMS 15 in accessing the database storage 16.

Figure 2:
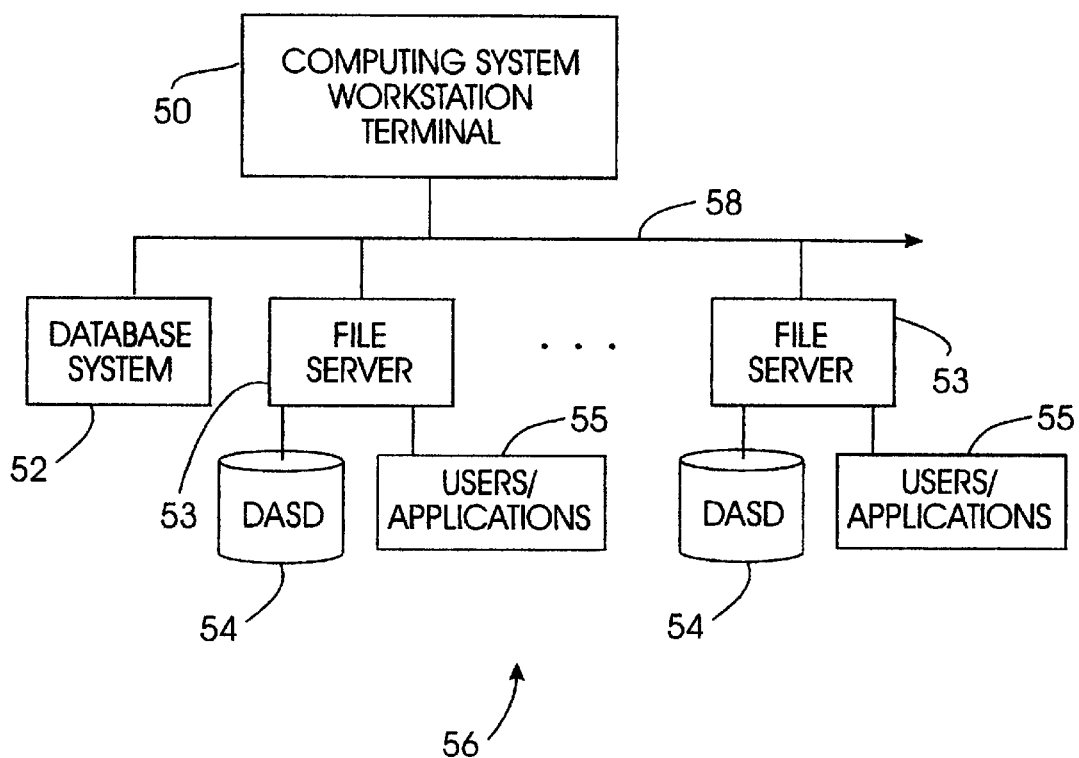
FIG. 2 is a block diagram representation of a computing system alternative to the FIG. 1 system, in which the file management system includes multiple file servers.

An alternate arrangement of a computing system in accordance with the invention is shown in FIG. 2, and includes a computing system terminal 50 coupled to a database system 52 and to a distributed file system 56 that includes a plurality of computer file servers 53, each with a local direct access storage device (DASD) 54, such as a disk drive, that may be accessed independently by a plurality of file system user terminals or applications 55. It should be understood that each of the computers in the FIG. 2 system (such as the terminal 50 and computer file server 53) has a similar construction, so that exemplary details described with respect to one file server will be understood to apply to all computers of the system. Each computer includes a central processing unit (CPU), an operating main memory, and a local direct access storage device (DASD), such as a disk drive. Each computer can communicate with the others via a network 58, and each thereby comprises a network node.

In the discussion of the preferred embodiment which follows, it is assumed that the database system being discussed is a relational database system (RDBMS) and that the database language used with it is the SQL language. It will, however, be apparent to the reasonably skilled artisan that the principles of the invention are not limited to the combination of an RDBMS or the SQL language with a file system. Indeed, the teachings of the preferred embodiment with respect to the invention are applicable to other database schemes and languages.

Further, the following discussion uses the term "file system" to denote a system of hardware and software that provides means for retrieval and management of files. When a file system resides in a node which is configured as network of computers, additional software can provide the local/remote transparency for file access. The file system and the additional software is then referred to as "the file server". The discussion assumes that a file server is a component of a particular kind of file system. This is not meant to limit the invention to being practiced only with file systems that include file servers.

Data Structure of the RDBMS

Figure 3:
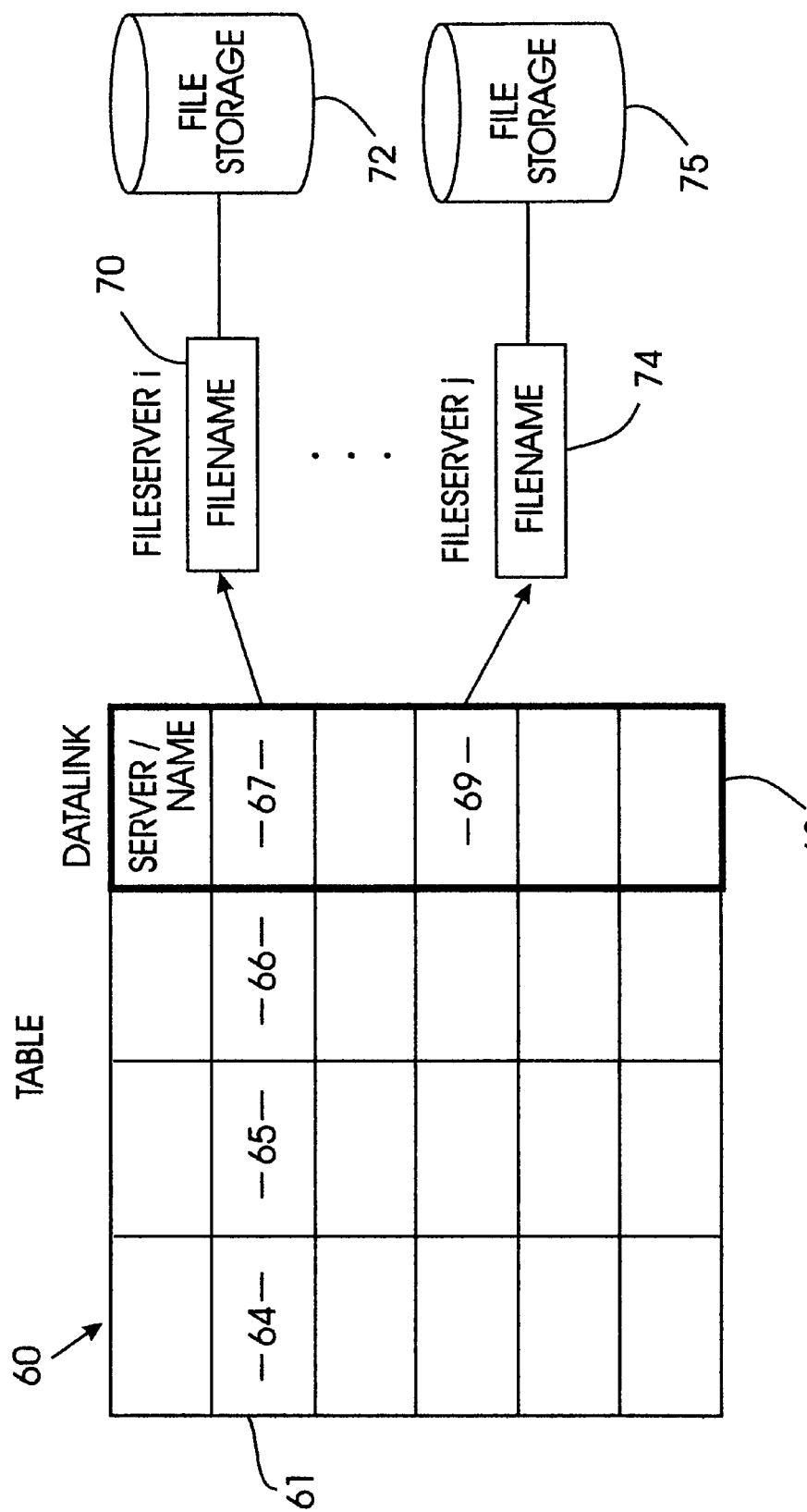
FIG. 3 is an illustration that shows links between a table in the relational database management system and files in the file management system of the FIG. 1 computer system constructed in accordance with the present invention.

FIG. 3 is a representation of the relational database management system (RDBMS) of FIG. 1, and shows that the RDBMS is based upon the existence of data relations that may be illustrated as tables, such as the data table 60 shown in FIG. 3. The data table 60 includes a plurality of columns mapped across a plurality of rows. The columns, such as the highlighted column 63, essentially define respective fields in the table rows, such as the designated row 61. Thus, the four columns of the data table 60 in FIG. 3 establish four fields 64, 65, 66, and 67 of the designated row 61. Each row of the data table may be thought of as a single table entry or data record. In relational database systems, rows are also referred to as "tuples". Table columns, such as the column 63, are also referred to as "attributes". Columns may be defined over "data types".

The RDBMS supports a Datalink data type for linking as described above. Preferably, the data structure for the Datalink data type includes the name of a server (file server) and the name of a ifile (filename). One suitable example and potential naming system for Datalink name identifiers are uniform resource locators (URLs). For purposes of FIG. 3, it can be assumed that the highlighted column 63 has been defined over the Datalink data type. It can further be assumed that the field 67 of the designated tuple 61 contains a "server i/filename" entry, a reference identifying a file server (server i) that controls a file 70 (filename) maintained in file storage 72. Similarly, the field 69 of another tuple 71 is a Datalink data type containing a server j/filename entry, comprising a reference to a file server (server j) that controls the file 74, which is named filename and is stored in the file storage 75.

When an application user of the computing system 10 issues an SQL Insert, SQL Delete, or SQL Update call in the database, the DBMS detects that this operation occurs on a column of type Datalink and issues a "LinkFile" command (or an "Unlinkfile" command or both commands, as the case may be) to an appropriate file server for the named file. The procedures that implement the LinkFile command apply certain constraints to the file. Such constraints include, for example, making a database system the owner of the named file and marking the file as a read-only file. This linkage is provided in a transactional manner. The rationale for changing the owner of the file to the database system from a file system user is to prevent the file from being renamed or deleted by file system users, which guarantees the integrity of any reference made in the database system to the file. Marking the file as read only guarantees the integrity of indexes that may be created on the file and stored in the database system for search. Thus, the database link embodied in the LinkFile command applies constraints that prevent renaming or deletion of the file by a file system user once the file is referred to in the database system.

With reference to FIGS. 1 and 3, the system 10 includes an application such as the application 24, one or more standard interfaces such as an SQL API 27 for database access, and a file system API 28 for standard file system calls (such as open, read, close) to access files. An application scenario can be understood as follows: Assume the application 24 issues an SQL "SELECT" statement to search on the database in the database storage 16. Assume further that the database includes the relation defined by the data table 60 (FIG. 3). In this regard, the query returns its results, which include one or more "serverx/filename" references, as column data in the Datalink data structure (assuming any Datalink column is selected in the query). The application 24 can then use the file system API 28 and the file communication path 34, employing standard file system protocols to access the relevant portion of a file.

Data Linking in Accordance with the Datalink Data Type

Figure 4:
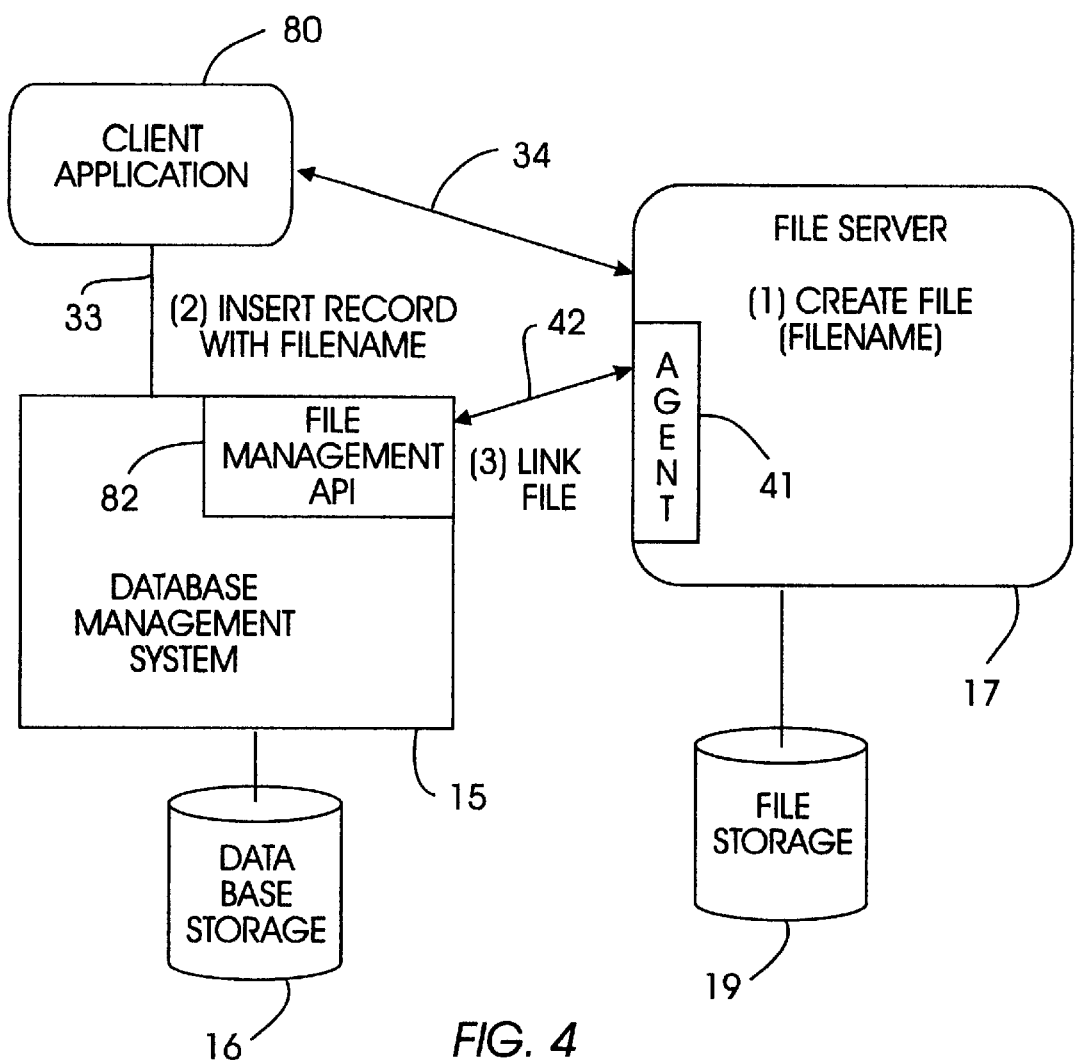
FIG. 4 is a process flow diagram that illustrates file linking operations in the computing system of FIG. 1.

FIG. 4 is a process drawing that illustrates a three-step LinkFile operation. In the first step, step (1), the file with the name filename is created in the file server 17 and accessed by the client application 80 over the file communication path 34. In step (2), the client application 80 sends a request over the SQL communication path 33 for the insertion of a record with a Datalink field containing a server/filename entry into the database stored at the database storage 16. In response to the request to insert the record, a file management API 82 in the API 40 links the file called filename by asserting control over the file; this is step (3). Control is asserted by a LinkFile command provided by a file management API 82 (one of the APIs 40) to the database agent 41 over the control communication path 42. The LinkFile command names the file, specifies a type of access control to be applied to the specified file, and conditions a read-only flag contained in the structure of the command to indicate whether or not the file is to be maintained in the read-only state.

The database agent 41 recognizes the LinkFile command and responds to it by denoting the DBMS 15 as the owner of the file in the file system, thereby preventing any file system user from renaming or moving the file. The agent 41 appropriately sets a read-only field in a file system directory according to the condition of the corresponding flag in the command. In denoting the DBMS 15 as the owner of the file at the file server 17, the LinkFile command prevents the named file from being renamed, moved, or deleted by any file system user for so long as it is linked to the database system by the reference to filename in the record inserted in step (2). This guarantees referential integrity of the reference in the inserted record.

FIG. 5 is a representation of metadata maintained by the file server of FIG. 1 for files stored in the file storage 19. The database agent 41 of the file server maintains its own persistent data structures such as the data structure 46 for tracking control information, provided over a control link 42 with the DBMS 15. As shown in FIG. 5, such control information includes, for example, group names, file names, access control, read-only flags, and recovery identification information. Thus, the database agent 41 informs the file system extension 44 (FIG. 1) as to control information, if any, asserted by a DBMS with respect to a file name found in the persistent data structure 46. If the database agent 41 informs the file system extension 44 that a file name is in the persistent data structure 46, the file system extension 44 rejects RENAME or DELETE requests directed to the named file from a file system user. In this manner, a file system 14 controls processing of files that have been adopted by a database system according to referential integrity constraints that include, without limitation, inhibition of RENAME and DELETE requests from file system users, read-only processing, if requested by the DBMS, and any other access control constraints communicated to the file system from the database system.

The File Manager

Figure 6:
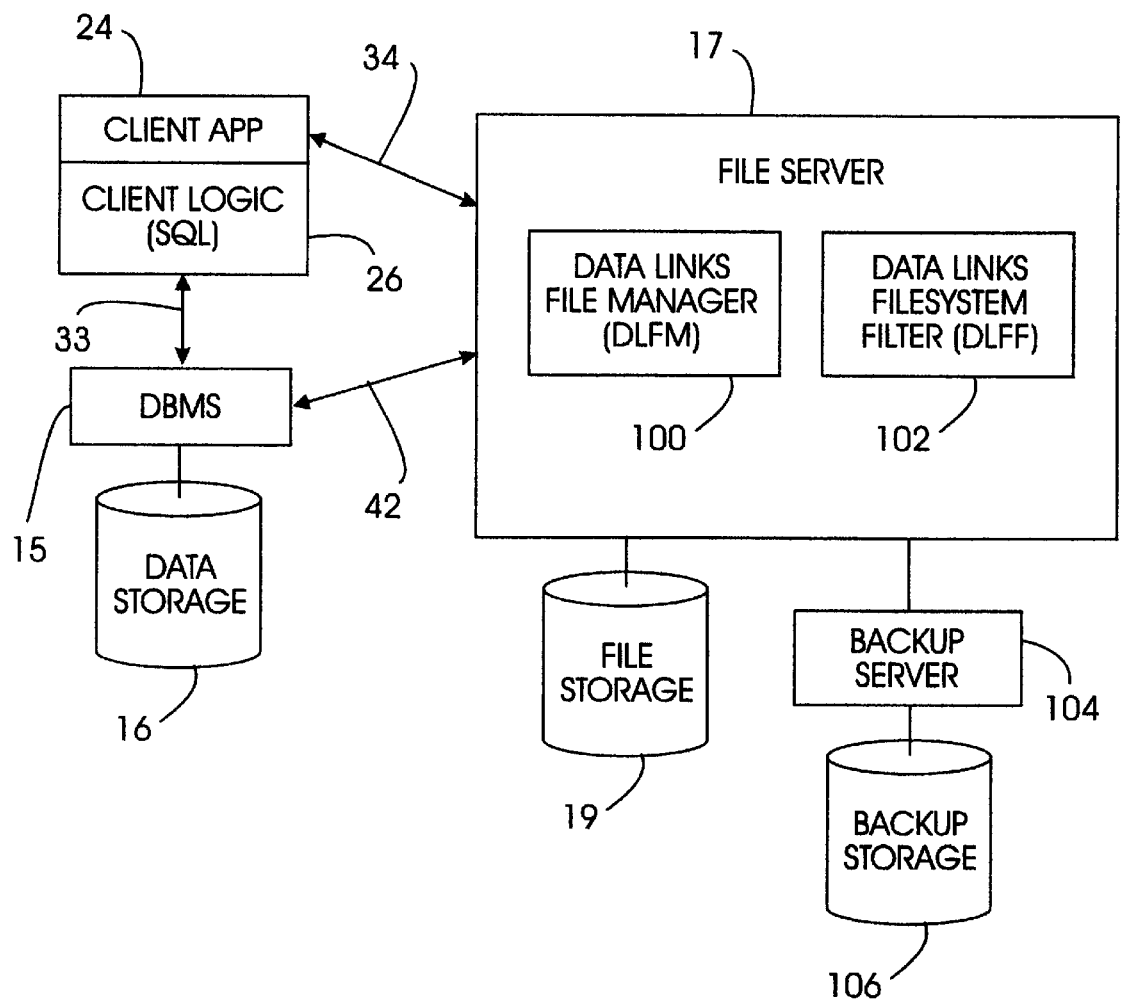
FIG. 6 is a functional block diagram representation of the file manager illustrated in FIG. 1.

FIG. 6 is a functional block diagram representation of the file server 17 illustrated in FIG. 1. In all other respects, like reference numerals refer to like structures. FIG. 6 shows that the file server 17 includes a DataLinks File Manager (DLFM) 100 and a DataLinks Filesystem Filter (DLFF) 102. These components maintain the file properties necessary for proper functioning of the system, as described further below. The file server 17 can be part of a larger computer network in which multiple file servers communicate with each other over a network. In this way, each file server comprises a node of the network and data sharing can easily take place.

There is one DLFM per file server node, whose files would be referenced by the DBMS. A client application interfaces with the DBMS using the SQL API. For example, as part of the data processing for an SQL "Insert" operation that would store the Datalink value in the database, the DBMS communicates with the appropriate DLFM on the network, based on the server name provided in the Datalink data value. This communication is the basis for the DBMS coordination with the management of files on the corresponding file server, as the database would be referencing the file from then on. The DLFM applies certain constraints to the file, which is referenced by the DBMS during the linking process described above. In addition, the DLFM maintains persistent information about the files of the local file server that are currently referenced by the DBMS or may have been referenced at some prior time, but is not currently referenced. Such information is required for maintaining referential integrity of files referenced by the DBMS and for supporting coordinated backup, restore, and recovery.

The DLFM supports transactional properties to the database data and references to the files, and also supports coordinated backup and recovery between the database files and file system files. The DBMS interacts with the DLFM using a two-phase commit protocol to provide transaction atomicity. In this capacity, the DBMS acts as the coordinator and the DLFM acts as the subordinate. The DLFM needs some recoverable (transactional) storage for keeping persistent information about the operations (such as LinkFile, UnlinkFile, and the like) that are initiated at the DLFM by the DBMS as a result of application calls such as SQL Insert, Update, or Delete. To support coordinated backup and recovery with the DBMS, the DLFM interfaces with a backup server to backup referenced files. For coordinated recovery, the DLFM may restore files from the backup server.

The DLFF enforces the constraints on files that are applied by the DLFM to the files referenced by the DBMS. For example, the file rename and delete must be prevented for a file that is referenced from the DBMS. The DLFF filters certain file server system calls, such as file open, rename, and delete. For example, the filter logic in the file open call can be used to provide database-centric access control that is rule-based. The filter logic for operations such as file rename and delete would prevent such actions from being performed directly by users if the file is referenced by the database to preserve referential integrity; that is, to avoid the problem of dangling pointers from the database to the file system.

The file server 17 communicates with a backup server 104, which includes backup, hierarchical storage 106. When the file server performs backup operations (described further below), copies of data files are transferred from the file server to the backup server.

File Append

Figure 7:
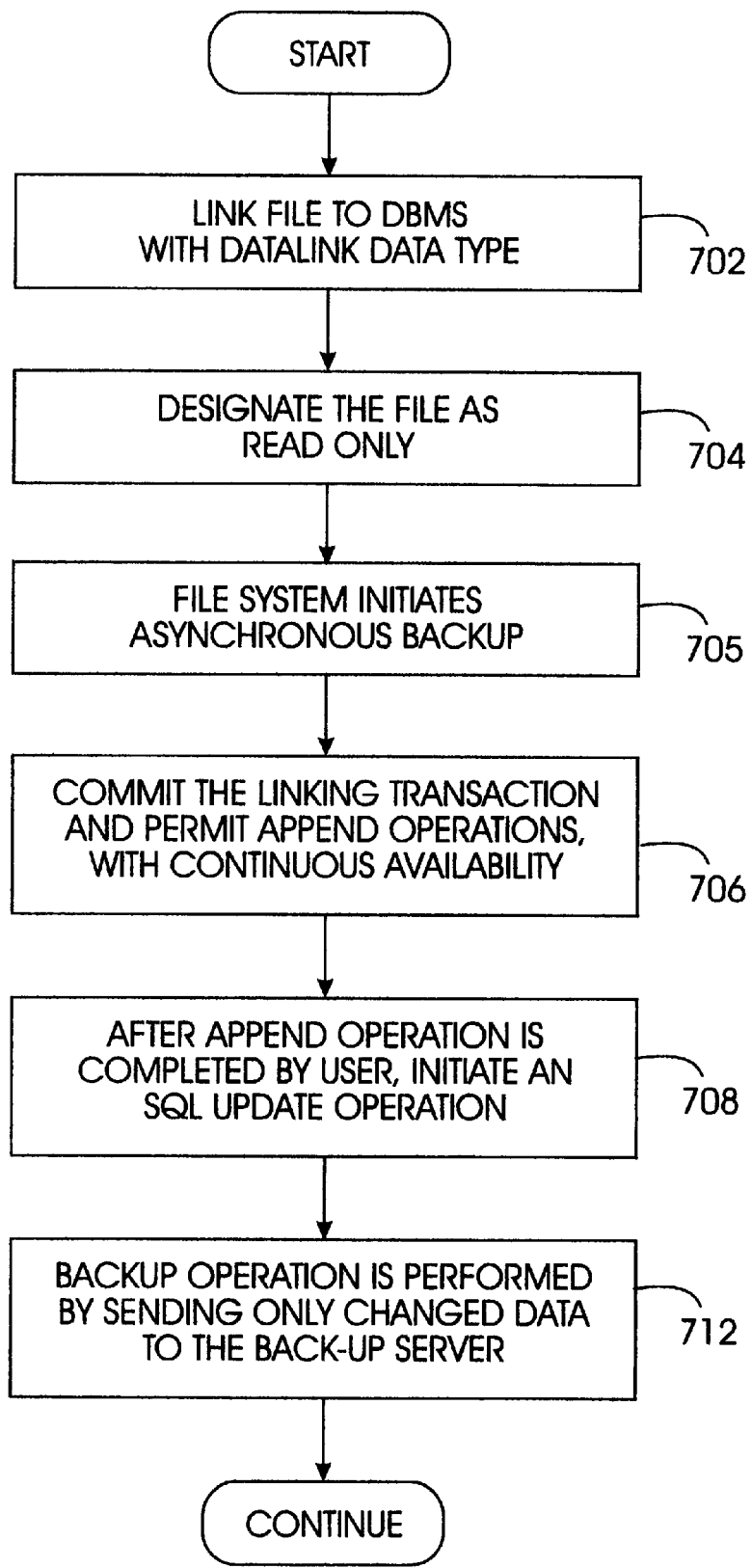
FIG. 7 is a flow diagram that illustrates file append operations in the computing system of FIG. 1.

FIG. 7 is a flow diagram that illustrates the steps executed by the computing system of FIG. 1 in carrying out the file append operations described briefly above. In an initial step of the processing, represented by the flow diagram box numbered 702, a file in the file storage system is linked to a DBMS having a Datalink EFR data type. In particular, the linking process involves inserting an external file reference (EFR) column into the file, which is included in the processing of the flow diagram box numbered 702. Next, in response to the linking, the file is designated to be a read-only file. This step is represented by the flow diagram box numbered 704 and, in the preferred embodiment of the "DataLinks" system by the IBM Corporation, comprises setting fields in the file metadata (such as illustrated in FIG. 5). When a file is linked, an automatic backup operation is performed. Therefore, the next step of computing system operation is for the file management system to generate a backup copy of the file. This step is represented by the flow diagram box numbered 705. In general, a backup of a file is created by sending a copy of the file to the backup server.

In the next step of computing system operation, the linking transaction is committed. Those skilled in the art will understand the details of the transaction commit operation in the context of a file management system. After the linking transaction is committed, the file management system permits a file open operation, and the file becomes available for the S append operation. In the DataLinks system, the DLFF module permits the append operations to take place by setting the appropriate field values in the metadata. In the preferred embodiment, the DLFF module provides continuous availability of the original file version to other users by setting the appropriate field values. This processing step is represented by the flow diagram box numbered 706.

After the owner of the linked file completes the append operations, the file owner (user) will initiate an update operation at the DBMS. The update operation involves updating the Datalink to refer to the file by updating the EFR column inserted by the SQL database manager (see the description above relating to the processing represented by the flow diagram box numbered 702). This SQL database EFR update is performed in a transactional manner. Thus, the update is either performed completely or it fails. The EFR update operation is equivalent to an atomic unlinkirelink process and results in an asynchronous backup operation being performed by the file manager. The EFR update operation is represented by the flow diagram box numbered 708.

As part of the processing, the file management system ensures that continuous availability of the original file and update of the appended data are transparent to the system users. For example, suppose an initial user is appending a file and a subsequent user retrieves a copy of the original file for reading. If the initial user checks-in the original file before the subsequent user returns the copy, the link will be updated. The subsequent user will, however, still have a handle to the older versions. In the preferred embodiment, the file management system guarantees to retain the original file in this event. The original-linked file is kept until all (outdated) copies are closed.

In the last processing step of the file append operations, the file management system initiates a backup operation on the new version of the file, the appended file. In the preferred embodiment, the backup operation is performed by sending only the changed data to the backup server. Such changes-only files are typically referred to as delta files. The processing of this step is represented by the flow diagram numbered 712.

File Update

Figure 8:
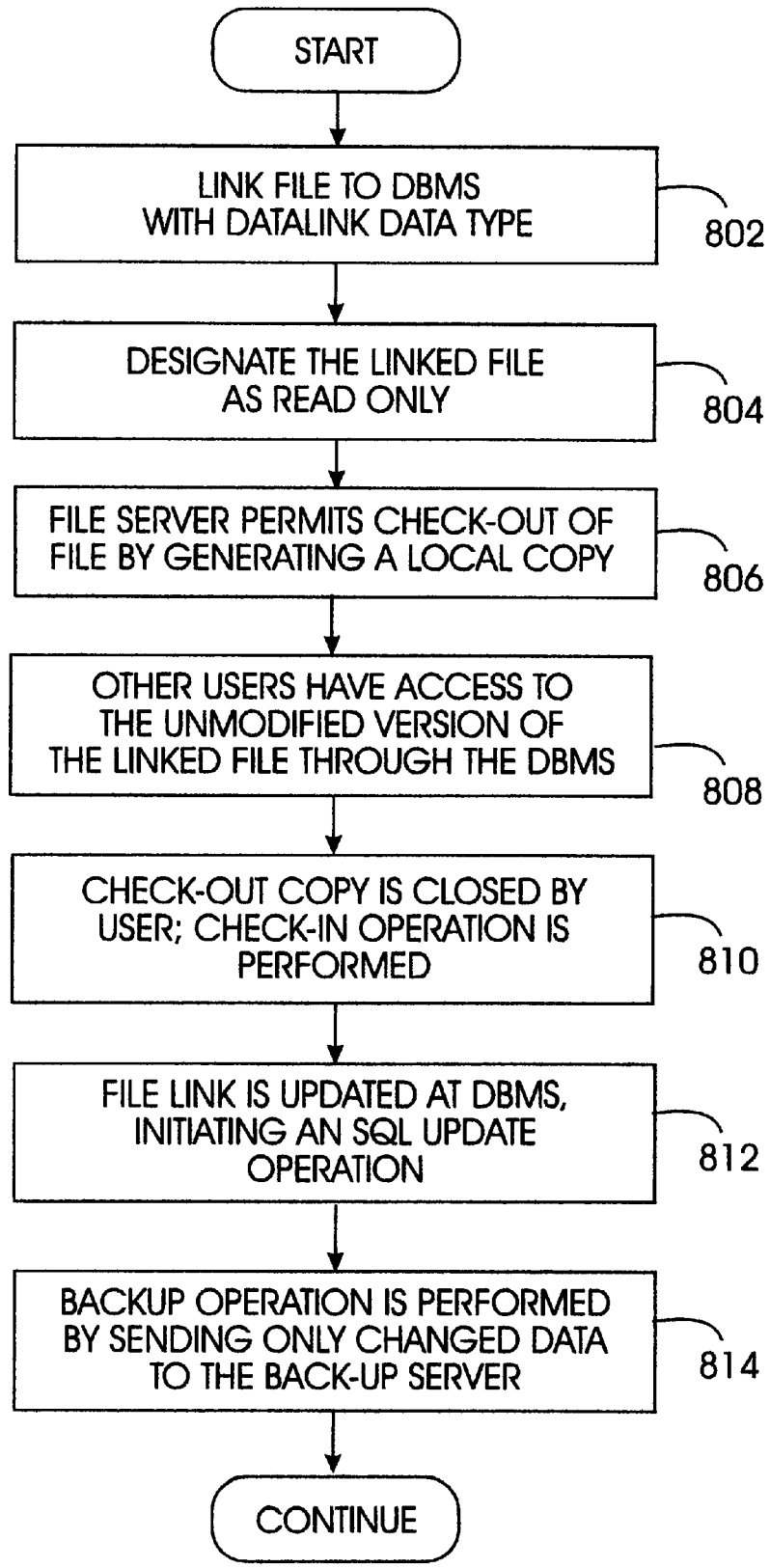
FIG. 8 is a flow diagram that illustrates file update operations in the computing system of FIG. 1.

FIG. 8 is a flow diagram that illustrates the steps executed by the computing system of FIG. 1 in carrying out the file update operations described above. In an initial step of the processing, represented by the flow diagram box numbered 802, a file in the file storage system is linked to a DBMS having a Datalink data type. Next, in response to the linking, the file is designated to be a read-only file. This step is represented by the flow diagram box numbered 804 and, in the preferred embodiment of the "DataLinks" system by the IBM Corporation, comprises setting fields in the file metadata (such as illustrated in FIG. 5). In the next step of computing system processing, the file management system permits a file open operation, and subsequent append operations by the user or application that opened the file. In the DataLinks system, the DLFF module controls file access and permits the update operations by setting the appropriate field values in the metadata. This processing step is represented by the flow diagram box numbered 806.

In the preferred embodiment of the invention, the DLFF module permits concurrent, continuous availability of the original version file by setting and recognizing appropriate field values for such concurrent operation. In particular, the processing of step 806 incorporates "check-out" and "check-in" processing by the DLFM. When a user updates a linked file, that user is-provided with a copy of the original linked file to maintain as a local copy for updating. During such updating operations, the original unmodified reference file version remains in the file storage. Because the file is designated read-only, other users are entitled to check out their own local copies of the unmodified file while the updates are proceeding. In this way, the computing system permits continuous availability of the file, even during file updates by another user. This feature of simultaneous access is represented in FIG. 8 by the flow diagram box numbered

808. When the initial user completes updating, the user initiates a file closing operation and file check-in is performed. This processing is represented by the flow diagram box numbered 810.

When the original file version is "checked in" by the initial user or application, the computing system updates the Datalink to refer to the checked in file by updating the EFR column inserted by the SQL database manager. This SQL database EFR update is performed in a transactional manner. Thus, the update is either performed completely or it fails. The EFR update operation is equivalent to an atomic unlink/relink process and results in an asynchronous backup operation being performed by the file manager. The EFR update operation is represented by the flow diagram box numbered 812.

As part of the processing, the file management system ensures that continuous availability of the original file and check-in of the updated file are transparent to the system users. For example, suppose an initial user is updating a file and a subsequent user retrieves a copy of the original file for reading. If the initial user checks-in the original file before the subsequent user returns the copy, the link will be updated. The subsequent user will, however, still have a handle to the older versions. In the preferred embodiment, the file management system guarantees to retain the original file in this event. The original linked file is kept until all (outdated) copies are closed.

In response to the SQL Update command. The file management system initiates a backup operation on the new version of the file, the updated file. In the preferred embodiment, the update operation is performed by sending only the changed data to the backup server. Such changes-only files are typically referred to as delta files. The processing of this step is represented by the flow diagram numbered 814.

Coordinated Backup

Figure 9:
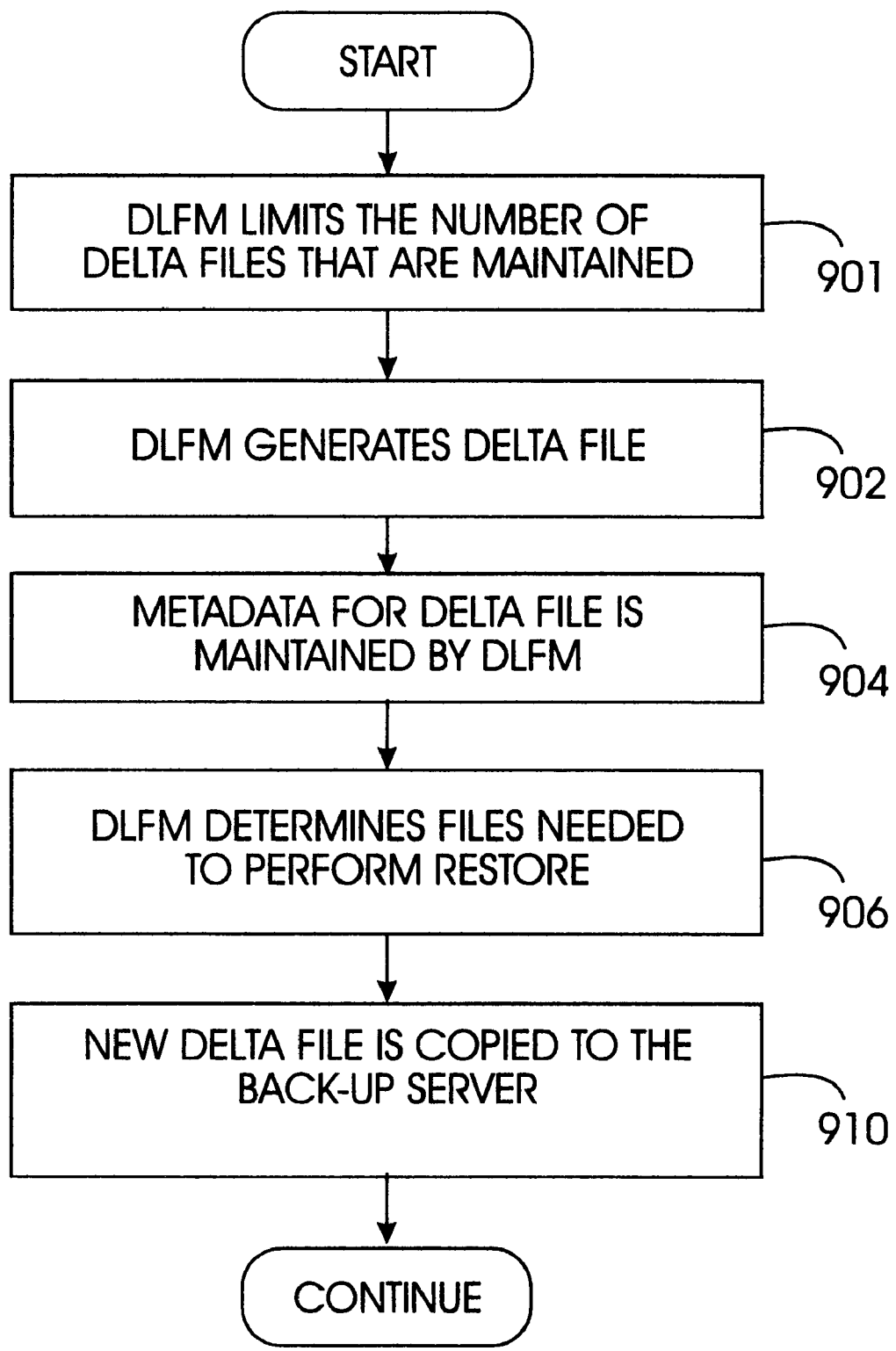
FIG. 9 is a flow diagram that illustrates database backup operations in the computing system of FIG. 1.

FIG. 9 is a flow diagram that illustrates the steps executed by the computing system of FIG. 1 in carrying out the backup operations described above. As noted, the SQL Update command modifies the Datalink data column of a file I s metadata and results in unlinking of the previous version of a file, and linking of the new version of the file. In the initial step of the backup processing, represented by the flow diagram box numbered 901, the file management system determines whether the number of delta files needed to completely generate a data file is too large for efficient operation. In this way, the DLFM limits the number of delta files for a given reference file to control the number of delta files that might have to be maintained in the computing system. Therefore, as part of the processing for the first step 901, the DLFM performs a backup operation for a completed appended file after a predetermined number (or data size) of delta files have been generated. That is, if the delta limit number has been exceeded, the DLFM first performs a backup operation to consolidate the reference file and existing delta files. The number of delta files to which the delta processing will be limited depends on the resources of the system in which the invention is implemented, and can be readily selected by those skilled in the art.

In the next step of the backup processing, represented by the flow diagram box numbered 902, the file management system creates a delta file by performing a delta compression process on the delta file(s) for the reference file. As noted above, a delta file for a reference file that has changed its contents comprises a file containing the differences of the changed file relative to the original reference file. Given a sequence of file changes, all the file incarnations from first to last can be generated by storing the first, reference version and by keeping all the succeeding delta files. It should be apparent that the delta file for an append operation is simply the appended data.

Systems such as the "DataLinks" system typically perform backup on all linked files at the time that they are linked (that is, all files referenced with a Datalink data type). Thus, the "Datalinker" (or equivalent component) may have a different version of a database file on its local file system. The database file is referred to as a "versioned" file. To improve the efficiency of backup for a versioned file, the delta compression scheme used according to the invention parses a data stream and compactly represents successive versions of data. Thus, given a versioned file called A1, if a backup operation on a subsequent file version called A2 is to be performed, then the delta compression scheme creates a compact file encoding of A2 called a delta file, represented as D(A1, A2). In typical database applications, data files that are subject to weekly backup are routinely ten to one hundred times smaller than the original file. The computing system of the present invention advantageously uses delta compression as part of the file backup operation.

In the Datalinks system, when an SQL update in the DBMS triggers the unlinking of an old version and the linking of a new version, (this happens for both append and update operations), the Datalinker file management system has two versions of the same data present on its local file system. With the files readily available, the two versions for delta compression are conveniently collocated and can be differenced and transmitted to a server easily.

More particularly, the computing system of FIG. 1 recognizes that, for many file types (such as news feeds and system logs), the differences between file versions are defined by new data that is added onto the end of the last data record. Similarly, if a data file is changed only with an append operation that adds data to the end of the file, then the delta file consists of only the appended data bytes. In either situation, a compact delta file results and the DLFM linking component can transmit the delta file to the backup server in lieu of the entire file. This makes the time required to perform backup proportional to the number of changed data bytes, rather than the size of the file. The processing of the delta compression scheme described above is represented by the flow diagram box numbered 902.

In the case of updated files, as part of the box 902 processing, the DLFM determines whether it is more efficient to perform a backup on the entire new file version (that is, parsing the complete file) as compared to performing a backup on the delta file only. If the entire new file will be subject to the backup, then the delta file might not be used and therefore no delta file name will be stored with the new metadata.

In the next step of processing, represented by the flow diagram box numbered 904, the DLFM maintains metadata on the delta file, storing the reference file name, the delta file name, and the new file name. This information is maintained in local data storage. In the case of an appended file, the new file name will be the same as the reference file name. This naming convention permits the DLFM to easily determine the sequence of files needed to restore a particular version of a file. That is, the reference file and a particular number of sequential "append" delta files can be processed by the DLFM to restore a desired file version. This processing is represented by the flow diagram box numbered 906, which indicates that the DLFM determines the number of delta files needed to restore a reference file.

As the last step of backup processing, represented by the flow diagram box numbered 910, the DLFM copies the delta file to the backup server. It should be understood that the updated metadata also is stored. Thus, the reference file name, the delta file name, and the new file name are stored. As noted above, for appended files, the reference file name and new file name will be the same, whereas for updated files, the reference file name will be different from the new file name.

It should be noted that the DBMS is not aware of the versioning of a file. When the Datalink column of the metadata is updated from one file name to another, it is an indication available to the DBMS that one file might be a version of another, but the delta versioning decision as to backup using the entire file or just the delta file is a decision made by the DLFM. As noted above, the decision making constraints will depend on the system resources available at the point of implementation, and will be apparent to those skilled in the art.

Exemplary Computer System

Figure 10:
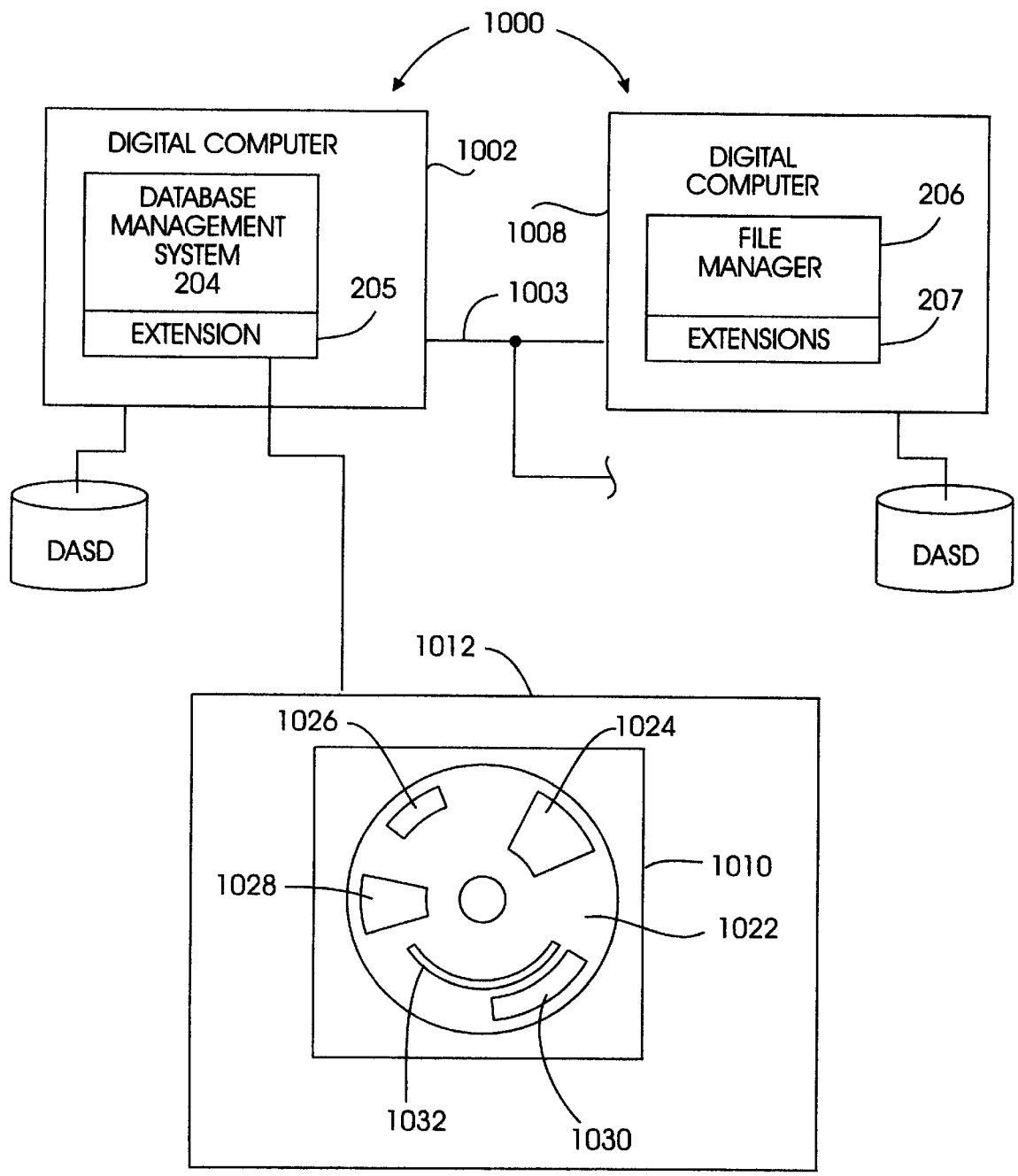
FIG. 10 is a block diagram of a computer system that utilizes a computer program product that contains programming instructions to implement the operation of the present invention.

FIG. 10 illustrates a digital computer system 1000 that can be programmed or otherwise designed to facilitate practice by the invention. As an example, the database system 12 of FIG. 1 can be implemented in a digital computer 1002 such as the "RS-6000" available from IBM Corporation, in which a DBMS 1004 (such as the "DB2" product available from IBM Corporation) may be installed. Alternatively, the database system may include the "DB2" product executing on a computer such as a "System 390" mainframe computer available from IBM Corporation. The file system 14 may include a file system 1006, such as an "AIX" file system, executing on a digital computer 1008 of the "RS-6000" type. A communications facility 1003, which may be a multinode network, couples the computers 1002 and 1008. Although the digital computers shown in FIG. 10 are separate and independent, the invention may be implemented using a single digital computer on which the database and file systems are separately executed using the multi-processing capability of the digital computer.

The invention can be embodied in extensions 1005, 1007 to the file manager 18 that may be embodied in an article of manufacture, such as one or more pre-recorded program product storage devices 1010. The program product storage devices may include, for example, magnetically recorded disks or tapes, or optically recorded CD-ROMs. The APIs 40 may be rendered as one or more computer software programs recorded on the pre-recorded data storage devices and integrated or linked with the DBMS 15 by conventional means including the storage drive 1012.

A program product storage device 1010 includes a recording medium 1022 on which is recorded program portions 1024, 1026, 1028, 1030, and 1032, each for directing a digital computer, such as the digital computers 1002 and 1008 to facilitate the practice of some portion of the procedures of this invention as described above. Even where no single one of the program portions 1024–1032 includes the entire group of procedures described above, the portions may comprise all program means necessary to direct a digital computer to operate according to the invention. Therefore, it can readily be appreciated that a computer program product including the storage device 1010, recording medium 1022, and program portions 1024–1032 will fall within the spirit and scope of the invention.

Advantages of the Invention

The present invention provides a computing system with continuous availability of data file that are maintained at a file management system and linked to a database management system (DBMS) through a Datalink data type, even while the file is being changed with append or update operations. When a file is linked, it is designated to be available for read-only operations. A user who wants to perform updates on a file gets a "check-out" copy of the file for updating operations, such that the original file remains linked to the database system while the copy is being updated and remains available to other users. A "check-in" function receives the updated file, saves the updated file under a new name different from the original, generates new metadata for the updated file, and transactionally updates the file with its new metadata. In this way, data files are continuously available to all users through updating actions. For an append operation, the file does not need to be checked out/in since data is only appended to. However, SQL update operations must be performed to include the new or changed metadata of the file at the DBMS, and cause backup of appended data. A "delta versioning" operation reduces the data needed to support backup operations and thereby permits more efficient backup of data files. This permits a Datalinks system to support the frequent update of continuously available data without the associated backup costs growing prohibitively.

The present invention has been described above in terms of presently preferred embodiments so that an understanding of the present invention can be conveyed. There are, however, many configurations for file management systems not specifically described herein but with which the present invention is applicable. The present invention should therefore not be seen as limited to the particular embodiments described herein, but rather, it should be understood that the present invention has wide applicability with respect to database and file management systems generally. All modifications, variations, or equivalent arrangements and implementations that are within the scope of the attached claims should therefore be considered within the scope of the invention.

We claim:

1. A method of modifying a reference file that is maintained in file storage by a file manager and is referentially linked from a database management system (DBMS) while continuously maintaining the referential link to the reference file for DBMS users, the method comprising the steps of:

creating a copy of the reference file, while continuously permitting read-only access to the stored reference file to system users directly through the file manager;

performing file modification operations on the copy of the reference file;

permitting continuous availability of the stored reference file to DBMS users during the file modification operations by continuously maintaining the link to the stored reference file during the file modification operations;

introducing the modified reference file into the file storage;

updating the link between the DBMS and the reference file to refer to the modified reference file in a single transaction; and performing automatic backup of the modified file by providing a copy of the modified reference file to a backup server.

2. A method of appending data to a file maintained in file storage by a file manager and referentially linked from a database management system (DBMS), the method comprising the steps of:
  linking the reference file to the DBMS with a Datalink data type;
  permitting read-only access to the reference file through the file manager;
  performing file append operations that add updated change data to the end of the reference file to define an appended file;
  permitting continuous availability of the reference file to system users during the file append operations by continuously maintaining the link to the reference file during the file append operations;
  updating the Datalink data type at the DBMS to refer to the appended data as a single transaction; and
  performing automatic backup of the appended file by providing a copy of the reference file and appended data to a backup server.

3. A method as defined in claim 2, wherein the step of performing automatic backup comprises the steps of:
  identifying the appended data; and
  maintaining a copy of the reference linked file and successive appended changes to the reference file copy at the backup server.

4. A method as defined in claim 3, wherein the appended changes comprise a delta compression file of compressed changes.

5. A method as defined in claim 1, wherein the step of performing file modifications comprises performing file update operations.

6. A method as defined in claim 5, wherein the step of performing file modifications comprises the steps of:
  performing a check-out operation by creating a check-out copy of the reference file and providing the check-out copy to an end user or application, leaving the reference file in the file storage;
  performing update operations on the check-out copy; and
  performing a check-in operation by receiving the updated check-out copy from the end user or application and backing up the checked-in file when updating the Datalink data type.

7. A method as defined in claim 5, wherein the step of performing automatic backup comprises the steps of:
  identifying the updated change data with respect to the reference file as a delta file of changes;
  determining if the updated change data delta file is smaller in size than the updated file copy by greater than a threshold value relative to the updated file; and
  maintaining the delta file at the backup server when the difference in size is less than the threshold value, and maintaining an unencoded version file at the backup server when the size is greater than the threshold value.

8. A method as defined in claim 7, wherein the updated change data comprises a delta compression file of compressed changes.

9. A method as defined in claim 5, wherein the step of performing automatic backup comprises the steps of:
  identifying the updated change data as a delta file of changes;
  performing delta compression on the updated change data to reduce the size of the updated change data;
  determining if the compressed updated change data is smaller in size than the updated file copy by greater than a threshold value relative to the updated file; and
  maintaining the delta file at the backup server when the difference in size is less than the threshold value and maintaining an unencoded version file at the backup server when the size is greater than the threshold value.

10. A method as defined in claim 2, wherein the step of performing automatic backup comprises associating successive file versions of data with corresponding successive non-null values of a Datalinks data type column.

11. A computer system comprising:
  a file server that has a file management system and is connected to end users or applications that comprise file server clients;
  a client system that supports file modification operations to copies of stored files;
  a file manager that executes in the file server and referentially links the stored files from a database management system (DBMS) with a Datalink data type, recognized by the DBMS, that identifies a file linked with the Datalinks data type as permitting read-only access, wherein the file manager permits file modification operations on the linked file such that the modifications are performed on a copy of the linked file and the stored file is continuously available to computer system users during the file modification operations by continuously maintaining the link to the stored file during the file modification operations and by updating the link to refer to the modified copy of the linked file as a single transaction.

12. A computer system as defined in claim 11, wherein the file manager further permits updating the file in file storage by transactionally unlinking the file referenced from the DBMS with the Datalink data type and linking the updated file and performing a transactional automatic backup operation on the updated file by providing a file copy to a backup server.

13. A computer system as defined in claim 12, wherein the file modifications comprise file append operations.

14. A computer system as defined in claim 13, wherein the file manager performs the automatic backup by identifying the appended data and by maintaining a copy of the reference stored file and successive appended changes to the copy at the backup server.

15. A computer system as defined in claim 13, wherein the appended changes comprise a delta compression file of compressed changes.

16. A computer system as defined in claim 13, wherein the file manager performs the automatic backup by identifying the appended data and by maintaining a copy of the reference stored file and successive appended changes to the copy at the backup server.

17. A computer system as defined in claim 12, wherein the file modifications comprise file update operations.

18. A computer system as defined in claim 17, wherein the file manager permits the file update operations by first performing a check-out operation by creating a check-out copy of the reference stored file, leaving the reference stored file in the file storage, then permitting the update operations to be performed on the check-out copy, and then performs a check-in operation by receiving the updated check-out copy and using it as the backup file copy.

19. A computer system as defined in claim 17, wherein the file manager performs the automatic backup by identifying the updated change data with respect to the reference stored file, determining if the updated change data is smaller in size than an unencoded versions file by greater than a threshold value relative to the unencoded versions file, and backing up the delta file when the difference in size is less than the threshold value and the unencoded version file when the size is greater than the threshold value.

20. A computer system as defined in claim 19, wherein the updated change data comprises a delta compression file of compressed changes.

21. A computer system as defined in claim 17, wherein the file manager performs the automatic backup by identifying the updated change data, performing data compression on the updated change data to reduce the size of the updated change data, determining if the compressed updated change data is smaller in size than an unencoded versions file by greater than a threshold value relative to the unencoded versions file, and backing up the delta file when the difference in size is less than the threshold value and the unencoded version file when the size is greater than the threshold value.

22. A file server comprising:
a processor;
file storage in which data files are maintained and accessed by a file management system that supports modifications to the files;
a database management system (DBMS) that referentially links the data files at the file manager from the DBMS with a Datalink data type, recognized by the DBMS; and
a file management system, having a file manager, in which the linked files are given read-only access and the file manager permits file modification operations on a linked file such that the modifications are performed on a copy of the linked file and the file in file storage is continuously available to computer system users during the file modification operations by continuously maintaining the link to the file in file storage during the file modification operations and by updating the link to refer to the modified copy of the linked file as a single transaction.

23. A file server as defined in claim 22, wherein the file manager further permits updating the file in file storage by transactionally unlinking the old file version referenced from the DBMS with the Datalink data type, linking the updated file version and performing a transactional automatic backup operation on the updated file by providing a file copy to a backup server.

24. A file server as defined in claim 23., wherein the file modifications comprise file append operations.

25. A file server as defined in claim 24, wherein the file manager performs the automatic backup by identifying the appended data and by maintaining a copy of the referenced base file and successive appended changes to the copy at the backup server.

26. A file server as defined in claim 24, wherein the appended changes comprise a delta compression file of compressed changes.

27. A file server as defined in claim 24, wherein the file manager performs the automatic backup by identifying the appended data and by maintaining a copy of the referenced base file and successive appended changes to the copy at the backup server.

28. A file server as defined in claim 23, wherein the file modifications comprise file update operations.

29. A file server as defined in claim 28, wherein the file manager permits the file update operations by first performing a check-out operation by creating a check-out copy of the referenced base file, leaving the referenced base file in the file storage, then permitting the update operations to be performed on the check-out copy, and then performs a check-in operation by receiving the updated check-out copy and using it as the backup file copy.

30. A file server as defined in claim 28, wherein the file manager performs the automatic backup by identifying the updated change data with respect to the referenced base file, determining if the updated change data is smaller in size than the referenced base file by greater than a threshold value relative to the base file, and maintaining a copy of the referenced base file and the updated change data if the difference in size is greater than the threshold value.

31. A file server as defined in claim 30, wherein the updated change data comprises a delta compression file of compressed changes.

32. A file server as defined in claim 28, wherein the file manager performs the automatic backup by identifying the updated change data, performing data compression on the updated change data to reduce the size of the updated change data, determining if the compressed updated change data is smaller in size than the referenced base file by greater than a threshold value relative to the referenced base file, and maintaining a copy of the referenced base file and the compressed updated change data if the difference in size is greater than the threshold value.

33. A program product data storage device, tangibly embodying a program of machine-readable instructions executable by a computer system, the program product comprising:
a recordable media; and
instruction steps recorded on the recordable media, the instruction steps comprising a file manager when executed by the computer system that accesses files maintained in file storage and communicates with a database management system (DBMS) that supports the linking of external files, wherein the file manager referentially links the files from the DBMS with a Datalink data type, recognized by the DBMS, that identifies a file linked with the Datalink data type as permitting read-only access, and the file manager permits file modification operations on a linked file such that the modifications are performed on a copy of the linked file and the file in file storage is continuously available to computer system users during the file modification operations by continuously maintaining the link to the file in file storage during the file modification operations and by updating the link to refer to the modified copy of the linked file as a single transaction.

34. A program product as defined in claim 33, wherein the file manager further permits updating the file in file storage by transactionally unlinking an old version of the file and linking an updated version of the file from the DBMS and performing a transactional automatic backup operation on the updated file by providing a copy of the updated version to a backup server.

35. A program product as defined in claim 34, wherein the file modifications comprise file append operations.

36. A program product as defined in claim 35, wherein the file manager performs the automatic backup by identifying the appended data and by maintaining a copy of the referenced base file and successive appended changes to the copy at the backup server.

37. A program product as defined in claim 35, wherein the appended changes comprise a delta compression file of compressed changes.

38. A program product as defined in claim 34, wherein the file modifications comprise file update operations.

39. A program product as defined in claim 38, wherein the file manager permits the file update operations by first performing a check-out operation by creating a check-out copy of the referenced base file, leaving the base file in the file storage, then permitting the update operations to be performed on the check-out copy, and then performs a check-in operation by receiving the updated check-out copy and using it as the backup file copy.

40. A program product as defined in claim 39, wherein the file manager performs the automatic backup by identifying the updated change data, performing data compression on the updated change data to reduce the size of the updated change data, determining if the compressed updated change data is smaller in size than the referenced base file by greater than a threshold value relative to the referenced base file, and maintaining a copy of the base file and the compressed updated change data if the difference in size is greater than the threshold value.

41. A program product as defined in claim 38, wherein the file manager performs the automatic backup by identifying the updated change data with respect to the referenced base file, determining if the updated change data is smaller in size than the referenced base file by greater than a threshold value relative to the referenced base file, and maintaining a copy of the referenced base file and the updated change data if the difference in size is greater than the threshold value.

42. A program product as defined in claim 41, wherein the updated change data comprises a delta compression file of compressed changes.

\* \* \* \* \*